(12) United States Patent
Sadahiro

(10) Patent No.: US 8,334,838 B2
(45) Date of Patent: Dec. 18, 2012

(54) PORTABLE ELECTRONIC APPARATUS

(75) Inventor: Tomoaki Sadahiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 482 days.

(21) Appl. No.: 12/438,329

(22) PCT Filed: Jul. 31, 2007

(86) PCT No.: PCT/JP2007/065021
§ 371 (c)(1),
(2), (4) Date: Jun. 22, 2010

(87) PCT Pub. No.: WO2008/023546
PCT Pub. Date: Feb. 28, 2008

(65) Prior Publication Data
US 2010/0265172 A1    Oct. 21, 2010

(30) Foreign Application Priority Data

Aug. 25, 2006   (JP) .................. 2006-229537

(51) Int. Cl.
*G06F 3/033* (2006.01)
(52) U.S. Cl. ............ 345/156; 345/173; 178/18.01
(58) Field of Classification Search .......... 345/156, 345/157, 173, 174, 175, 184; 178/18.01, 178/18.03, 18.05, 18.06, 18.07
See application file for complete search history.

(56) References Cited

U.S. PATENT DOCUMENTS

| | | | |
|---|---|---|---|
| 6,677,927 B1 * | 1/2004 | Bruck et al. | 345/156 |
| 2003/0076306 A1 * | 4/2003 | Zadesky et al. | 345/173 |
| 2003/0095096 A1 * | 5/2003 | Robbin et al. | 345/156 |
| 2004/0252109 A1 * | 12/2004 | Trent et al. | 345/174 |
| 2006/0279554 A1 * | 12/2006 | Shin et al. | 345/173 |
| 2007/0057922 A1 * | 3/2007 | Schultz et al. | 345/173 |

FOREIGN PATENT DOCUMENTS

| | | |
|---|---|---|
| JP | 2001-184158 | 7/2001 |
| JP | 2003-256101 | 9/2003 |
| JP | 2003-280792 | 10/2003 |
| JP | 2004-311196 | 11/2004 |
| JP | 2005-522797 | 7/2005 |
| WO | WO 03/088179 A1 | 10/2003 |
| WO | WO 2006/070531 A1 | 7/2006 |

OTHER PUBLICATIONS

Japanese language office action dated Aug. 2, 2011 and its English language translation for corresponding Japanese application 2008530842.
Japanese language office action dated Mar. 8, 2011 and its English language translation for corresponding Japanese application 2008530842.

* cited by examiner

*Primary Examiner* — Amare Mengistu
*Assistant Examiner* — Koosha Sharifi-Tafreshi
(74) *Attorney, Agent, or Firm* — DLA Piper LLP (US)

(57) ABSTRACT

A portable electronic apparatus 100 includes a sensor unit 120 detecting an operation with movement, and a control unit 110 controlling a selection operation of selecting one choice from a plurality of choices based on a moving operation detected by a sensor element. The sensor unit 120 is configured by being divided into sensor element groups G1 and G2, and the control unit 110 causes the selection operations to differ from each other in the sensor element groups G1 and G2 when directions of the operations with movement are the same.

10 Claims, 13 Drawing Sheets

(a)

(b)

PRIOR ART

PORTABLE ELECTRONIC APPARATUS

TECHNICAL FIELD

The present invention relates to a portable electronic apparatus, and more particularly, to a portable electronic apparatus provided with an operation detecting unit which detects an operation with movement.

BACKGROUND ART

Conventionally, various interfaces and configurations have been developed as the operation detecting units of portable electronic apparatuses. For example, there is the art in which a rotary dial type input device is provided at a portable electronic apparatus, and a cursor displayed on a display unit is moved in accordance with the rotation quantity of the rotary dial type input device (see Patent Document 1).

Further, there are proposed the arts of using touch sensors as operation input units that do not involve physical and mechanical rotation (see Patent Documents 2 and 3). The proposed art each arranges a plurality of touch sensor elements continuously, detects the operation with movement based on contact detection from the individual touch sensor elements, and intends to perform selection operation control of selecting one choice from a plurality of choices in accordance with the detection result.

Patent Document 1: Japanese Patent Laid-Open No. 2003-280792
Patent Document 2: Japanese Patent Laid-Open No. 2005-522797
Patent Document 3: Japanese Patent Laid-Open No, 2004-311196

SUMMARY OF INVENTION

Technical Problem

However, in the conventional proposed arts, all of a plurality of sensor elements which are arranged continuously are managed under one management architecture, and therefore, only single selection operation control can be performed based on the moving operation in a predetermined direction.

FIG. 13 shows a conventional touch sensor element and its selection operation control example. As shown in the drawing, when the sensor element provided in a circular form is traced with a finger as the arrow AR, for example, and a clockwise moving operation is performed, items LS1 to LS8 of the display unit of FIG. 13 (b) is scrolled downward, and when a counterclockwise moving operation is performed, they are scrolled upward. That is, the items are scrolled only in the same direction based on the moving operation in a predetermined rotating direction. More specifically, the configuration is adopted, in which only single selection operation control is performed based on the moving operation in the predetermined direction, and the conventional touch sensor element has the problem of having a narrow range of operability.

The present invention is made in view of such a problem, and an object of the present invention is to provide a portable electronic apparatus, which can perform control of a plurality of selection operations based on the operation with movement in a predetermined direction, and can widen the range of operability.

Solution to Problem

In order to attain the above described object, a portable electronic apparatus of the present invention is characterized by having an operation detecting unit detecting an operation with movement, and a selection operation control unit controlling a selection operation of selecting one choice from a plurality of choices based on a moving operation detected by the operation detecting unit, and characterized in that the operation detecting unit is configured with a detection region of the moving operation being divided into a plurality of regions, and the selection operation control unit causes the selection operations corresponding to the plurality of regions to differ from each other when directions of the operations with movement which are performed in the plurality of regions are respectively the same.

The selection operation control unit preferably causes the selection operations corresponding to the plurality of regions to differ from each other in accordance with speeds of movement relating to the operations when the directions of the operation with movement which are performed in the plurality of regions are respectively the same, the operation detecting unit is preferably configured by being placed in a circular form and by being divided into two regions, and a display unit capable of displaying at least the selected one choice is preferably provided in a central region of the operation detecting unit placed in the circular form, and the display unit is preferably configured to display the plurality of choices, and highlight one choice selected by the selection operation control unit out of the plurality of choices which are displayed.

The operation detecting unit placed in the circular form is preferably divided into two regions that are a left region and a right region bilaterally symmetrically with respect to an orientation of display displayed on the display unit, the operation detecting unit preferably detects an operation with clockwise movement in the left region, and an operation with counterclockwise movement in the right region as a first operation, and detects an operation with counterclockwise movement in the left region, and an operation with clockwise movement in the right region as a second operation. Further, the display unit displays choices which are continuously selected by the selection operation control unit as the plurality of choices by arranging the choices in sequence from a bottom to a top with respect to an orientation of the display based on continuous operation of the first operation, and displays choices which are continuously selected by the selection operation control unit as the plurality of choices by arranging the choices in sequence from the top to the bottom with respect to the orientation of the display based on continuous operation of the second operation.

Alternatively, the operation detecting unit placed in the circular form is preferably divided into two regions that are an upper region and a lower region vertically symmetrically with respect to an orientation of display displayed on the display unit, the operation detecting unit preferably detects an operation with clockwise movement in the upper region, and an operation with counterclockwise movement in the lower region as a third operation, and detects an operation with counterclockwise movement in the upper region, and an operation with clockwise movement in the lower region as a fourth operation. Further, the display unit preferably displays choices which are continuously selected by the selection operation control unit as the plurality of choices by arranging the choices in sequence from a left to a right with respect to an orientation of the display based on continuous operation of the third operation, and displays choices which are continuously selected by the selection operation control unit as the plurality of choices by arranging the choices in sequence from the right to the left with respect to the orientation of the display based on continuous operation of the fourth operation.

Further, the present invention is preferably provided with fixing means for fixing one choice selected by the selection operation control unit out of the plurality of choices.

Advantageous Effects on Invention

The present invention can cause the selection operation control to differ in a plurality of regions when the direction of the moving operation is the same in each of the divided regions, and therefore, can widen the range of operability.

DESCRIPTION OF EMBODIMENTS

Figure 1:
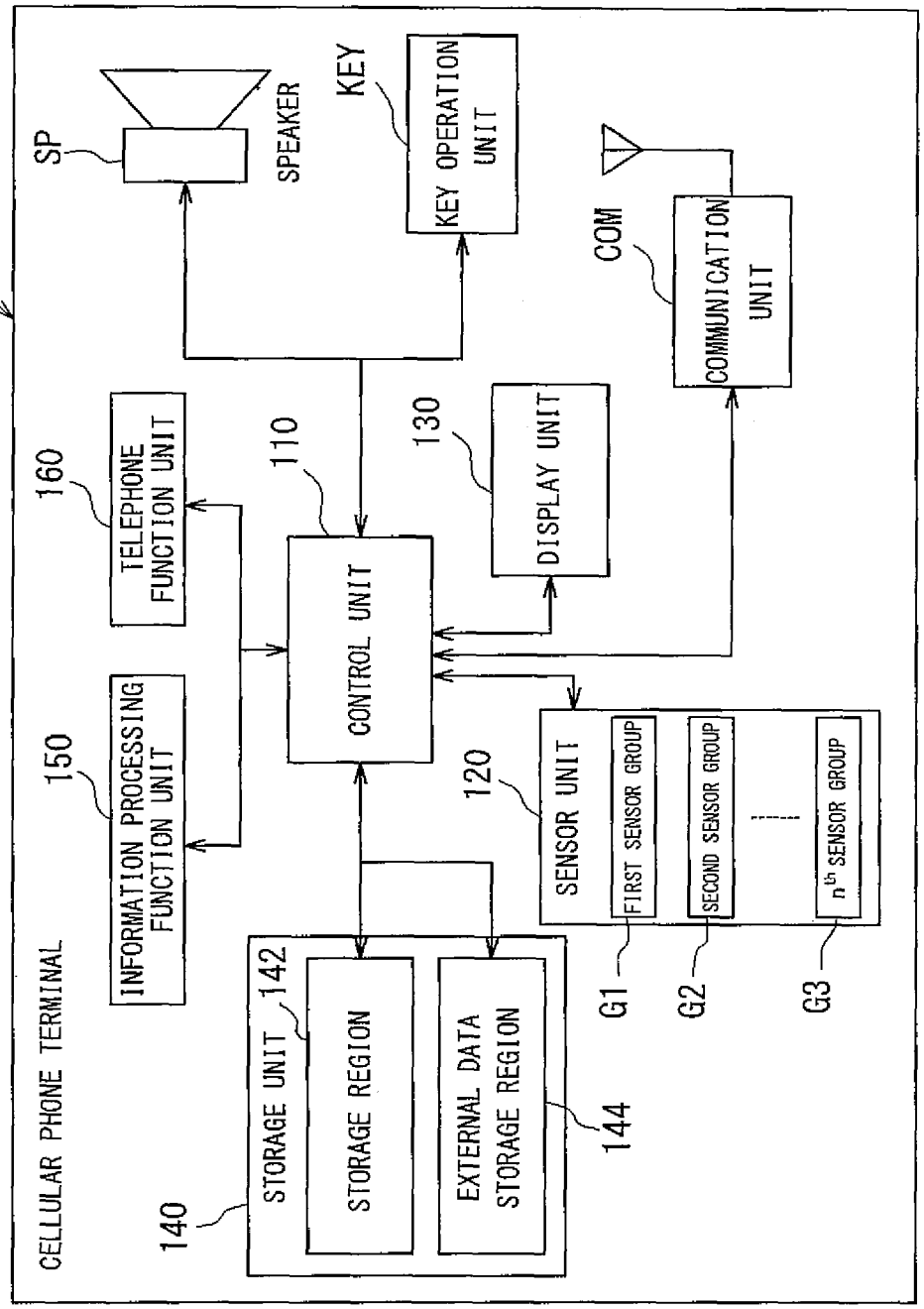
FIG. 1 is a block diagram showing a basic configuration of a cellular phone terminal to which the present invention is applied.

An embodiment of the present invention will be descried with reference to the drawings. Hereinafter, the present invention will be described by being applied to a cellular phone terminal as the typical example of a portable electronic apparatus. FIG. 1 is a block diagram showing the basic configuration of the cellular phone terminal to which the present invention is applied. A cellular phone terminal 100 shown in FIG. 1 is configured by a control unit (selection operation control unit) 110, a sensor unit (operation detecting unit) 120, a display unit 130, a storage unit (flash memory, or the like) 140, an information processing function unit 150, a telephone function unit 160, a key operation unit KEY and a speaker SP, and further, a communication unit COM which performs communication by being connected to a CDMA communication network not illustrated. Further, the sensor unit 120 includes n of sensor element groups including a plurality of sensor elements (for example, contact sensors having their detecting units provided on the outer surface of the apparatus casing, and detecting contact and approach of an object such as a finger) in accordance with a use purpose. That is, the sensor unit 120 includes a first sensor element group G1, a second sensor element group G2 and an $n^{th}$ sensor element group G3, and the storage unit 140 is configured by a storage region 142 and an external data storage region 144. The control unit 110 and the information processing function unit 150 are preferably configured by calculating means such as a CPU, a software module, and the like. A serial interface unit SI which will be described later, an RFID module RFID and an infrared-ray communication unit IR which are connected to the control unit 110 via the serial interface unit SI, further, a camera 220 and a light 230, in addition to which, a microphone MIC, a radio module RM, a power supply PS, a power supply controller PSCON and the like are connected to the control unit 110, but they are omitted here for simplification.

The function of each block in the block diagram of FIG. 1 will be briefly described. The control unit 110 detects contact of an object by a finger or the like of a user by the sensor unit 120, stores the detected information in the storage region 142 of the storage unit 140, and controls processing of the stored information by the information processing function unit 150. Subsequently, the control unit 110 causes the display unit 130 to display the information corresponding to the processing result. Further, the control unit 110 controls the telephone function unit 160 for an ordinary call function, the key operation unit KEY and the speaker SP. The display unit 130 is configured by including a sub display unit ELD and a main display unit not illustrated (display unit which is provided at a position where it is hidden in the closed state of the cellular phone terminal 100, and is exposed in the opened state).

Figure 2:
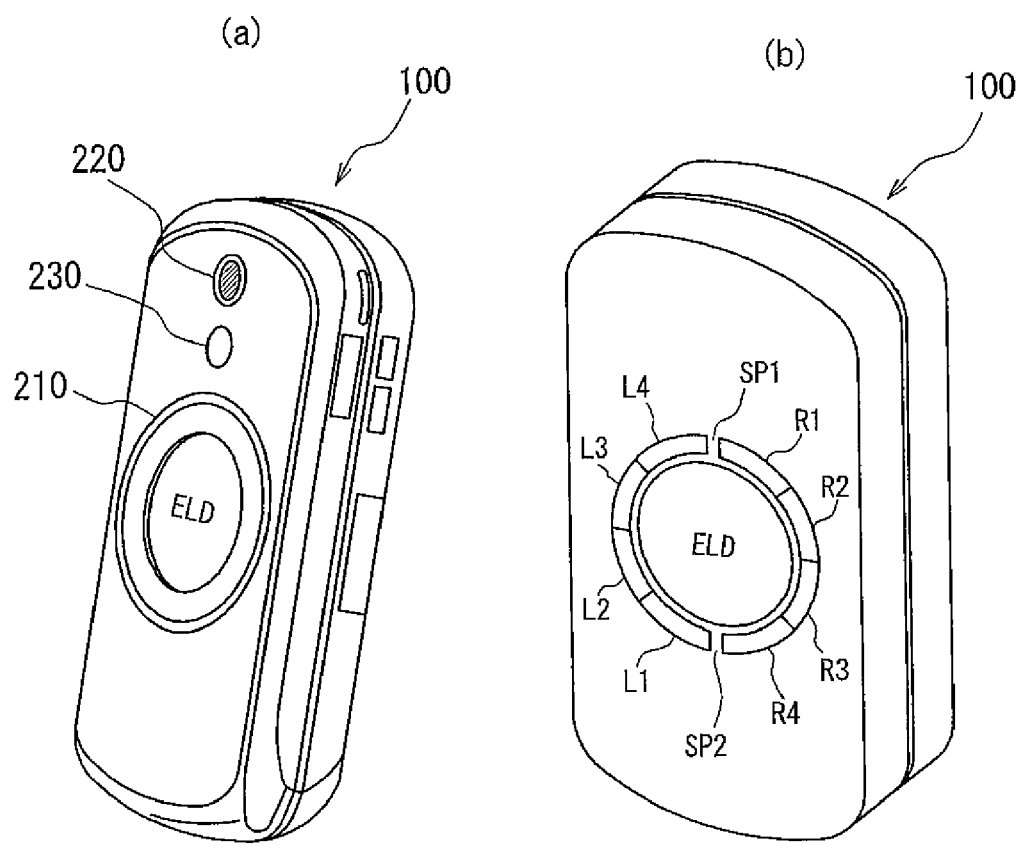
FIG. 2 is a perspective view of the cellular phone terminal with sensor elements mounted on a casing.

FIG. 2 is a perspective view of the cellular phone terminal with sensor elements mounted on the casing. The cellular phone terminal 100 is capable of forming an opened state by turning and sliding the hinge portion, in addition to the closed state as shown in FIG. 2, and a touch sensor unit 210 is provided at a position where it is operable even in the closed state. FIG. 2 (a) is a perspective view showing the appearance of the cellular phone terminal 100. The cellular phone terminal 100 includes the touch sensor unit 210 (in appearance, a panel PNL which covers the sensor unit 120, that is, the sensor element groups G1 and G2 is seen (which will be described later with FIG. 6)), the camera 220, and the light 230. FIG. 2 (b) is a perspective view of the cellular phone terminal 100 showing only the placement of the sensor elements, the sub display unit ELD and its periphery by omitting the panel PNL for explanation of the operation of the touch sensor. As in the drawing, sensor elements L1 to L4 and R1 to R4 are placed laterally side by side in an annular form along the periphery of the sub display unit ELD. As will be described later, the sensor elements L1 to L4 and R1 to R4 may be placed vertically side by side in an annular form. The sensor elements L1 to L4 configure the first sensor element group (region) G1, and the sensor elements R1 to R4 configure the second sensor element group (region) G2. The first sensor element group G1 and the second sensor element group G2 are partitioned with separation units SP1 and SP2 therebetween. In contrast with the layout of the first sensor element group G1, the second sensor element group G2 has a layout of line symmetry with the direction in which the selection candidate items are arranged as a center line, with the sub display unit ELD therebetween. By dividing the sensor elements into the two element groups like this, the operation environment, which is not too complicated, and intuitively understandable, is provided. Further, in this configuration, an organic EL display is used for the sub display unit ELD, but, for example, a liquid crystal display or the like may be used. Further, an electrostatic capacity type of contact sensor is used as the sensor element in this configuration, but a thin film resistor type contact sensor may be used. Further, mechanical switches may be placed side by side.

In the cellular phone terminal 100 of FIG. 2, the sub display unit ELD displays the information corresponding to the use purpose of the cellular phone terminal 100. For example, when the cellular phone terminal 100 is used as a music player, the titles of pieces of music which can be played are displayed on the sub display unit ELD. The title and the name of an artist of a piece of music constitute one item, that is, "selection candidate item (choice)". When the user operates the touch sensor unit 210 as the operation input unit to change the electrostatic capacities of the sensor elements L1 to L4 and R1 to R4, the control unit 110 moves the item displayed on the sub display unit ELD and the operation target region to select the title of a piece of music (selection operation control). At this time, if the touch sensor unit 210 has a configuration in which the sensor elements are arranged around the sub display unit ELD as shown in FIG. 2, it does not have to occupy a large mounting portion in the outer casing of the compact portable electronic apparatus, and a user can operate the sensor elements while watching the display on the sub display unit ELD.

Figure 3:
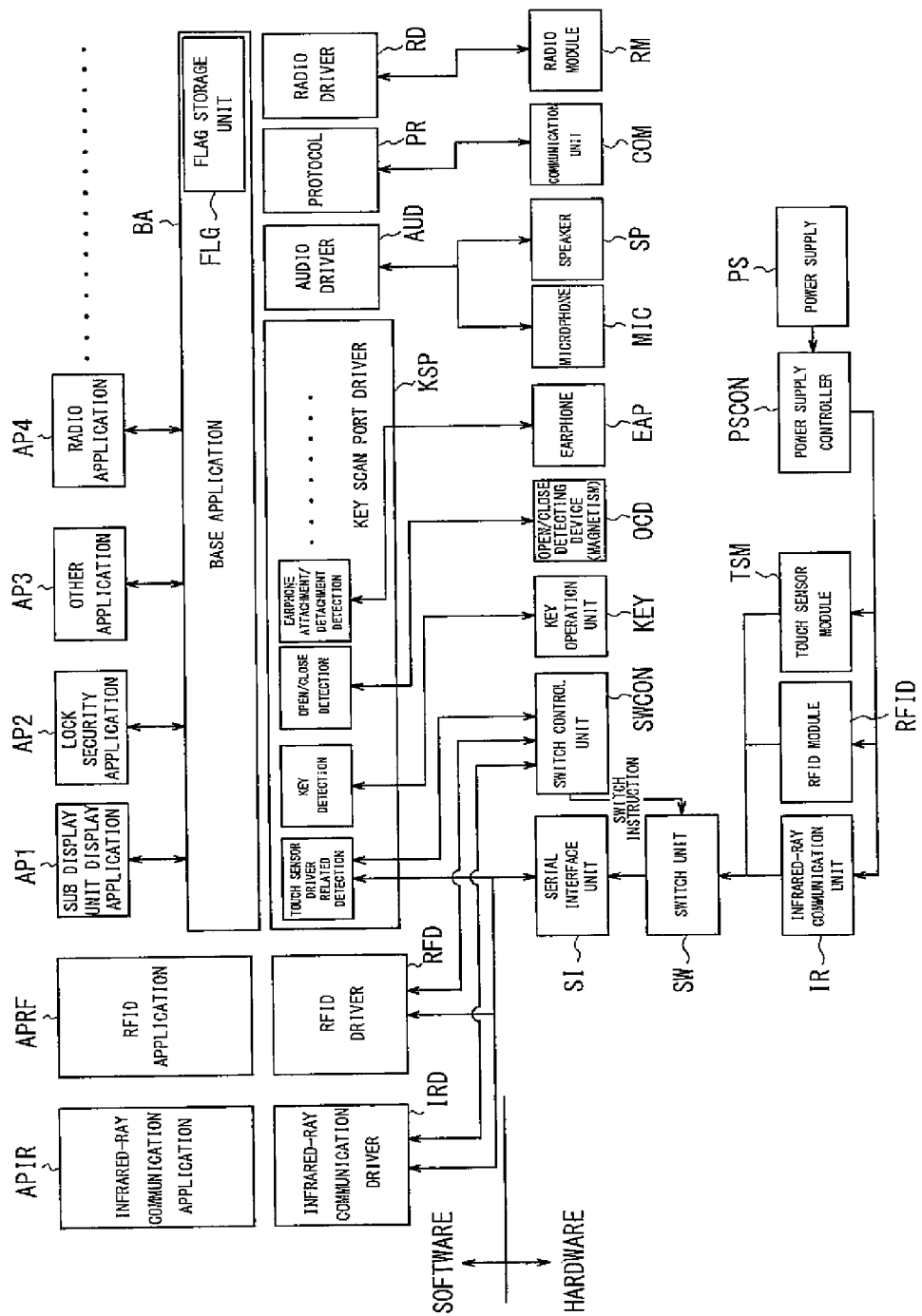
FIG. 3 is a detailed functional block diagram of the cellular phone terminal to which the present invention is applied.

FIG. 3 is a detailed functional block diagram of the cellular phone terminal 100 to which the present invention is applied. Needless to say, various kinds of software shown in FIG. 3 are operated by being executed by the control unit 110 after a work area is provided on the storage unit 140, based on the program stored in the storage unit 140. As shown in the drawing, the various functions of the cellular phone terminal are divided into a software block and a hardware block. The software block is configured by a base application BA having a flag storage unit FLG, a sub display unit display application AP1, a lock security application AP2, the other application AP3, and a radio application AP4. The software block further includes an infrared-ray communication application APIR and an RFID application APRF. When these kinds of applications (application software) control various kinds of hardware of the hardware block, an infrared-ray communication driver IRD, an RFID driver RFD, an audio driver AUD, a radio driver RD, and a protocol PR are used as drivers. For example, the audio driver AUD, the radio driver RD and the protocol PR control the microphone MIC, the speaker SP, the communication unit COM, and the radio module RM, respectively. The software block further includes a key scan port driver KSP which monitors and detects the operation state of the hardware, and performs detection related to the touch sensor driver, key detection, open/close detection detecting opening and closing of the cellular phone terminal of a folding type, a slide type or the like, earphone attachment/detachment detection and the like.

The hardware block is configured by the key operation unit KEY including a dial key, various buttons including tact switches SW1 (one of fixing means) and SW2 (one of fixing means), and the like, an open/close detecting device OCD which detects open/close based on the operation state of the hinge portion or the like, the microphone MIC accompanying the apparatus main body, a detachable and attachable earphone EAP, the speaker SP, the communication unit COM, the radio module RM, the serial interface unit SI, and a switch control unit SWCON. The switch control unit SWCON selects any one of the infrared-ray communication unit IR, the RFID module (radio recognition tag) RFID, and the touch sensor module TSM (modularization of the sensor unit 120 and a set of components necessary for driving the sensor unit 120, such as an oscillation circuit) in accordance with the instruction from the corresponding block of the software block to switch the selection target hardware (IR, RFID, TSM) so that the serial interface unit SI picks up the corresponding signal. The power supply PS supplies power to the selection target hardware (IR, RFID, TSM) via the power supply controller PSCON.

Figure 4:
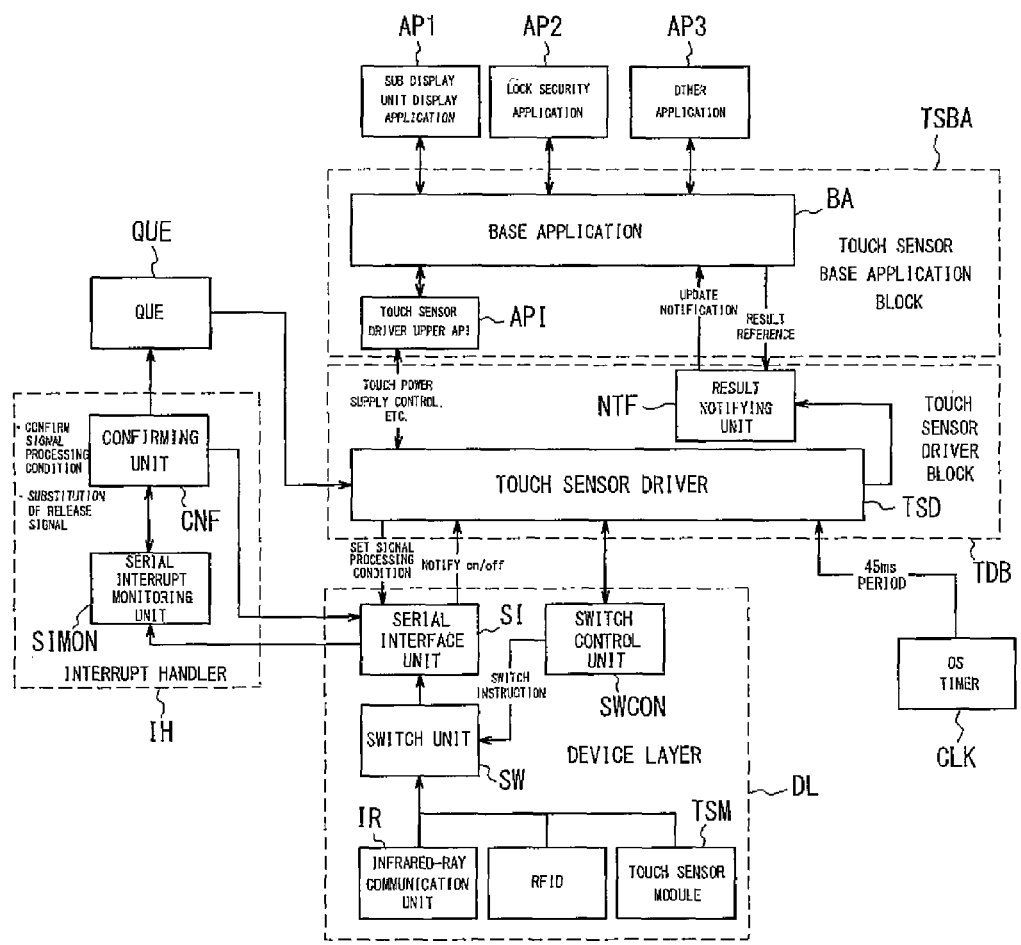
FIG. 4 is a block diagram showing a more detailed configuration of a touch sensor function of the cellular phone terminal according to the present invention.

FIG. 4 is a block diagram showing a more detailed configuration of the touch sensor function of the cellular phone terminal 100 according to the present invention. As shown in the drawing, the cellular phone terminal 100 includes a touch sensor driver block TDB, a touch sensor base application block TSBA, a device layer DL, an interrupt handler IH, a que QUE, an OS timer CLK, and various applications AP1 to AP3. Here, the touch sensor base application block TSBA includes a base application BA and a touch sensor driver upper application program interface API, and the touch sensor driver block TDB includes a touch sensor driver TSD and a result notifying unit NTF. Further, the device layer DL includes a switch control unit SWCON, a switch unit SW, the serial interface unit SI, the infrared-ray communication unit IR, the RFID module RFID and a touch sensor module TSM, and the interrupt handler IH includes a serial interrupt monitoring unit SIMON and a confirming unit CNF.

Next, the function of each of the blocks will be described with reference to the drawings. In the touch sensor base application block TSBA, exchange of the information of whether to activate the touch sensor or not is performed between the base application BA and the touch sensor driver upper application program interface API. The base application BA is the application to be the base of the sub display unit display application AP1 which is the application for the sub display unit, the lock security application AP2 which is the application for locking the cellular phone terminal 100 for security protection, and the other application AP3, and requests the touch sensor driver upper application program interface API to activate the touch sensor when the base application BA is requested to activate the touch sensor from each of the aforesaid applications. The sub display unit is the sub display unit ELD shown in each of the drawings, and indicates the display unit provided in the central region of the sensor element groups disposed in a circular shape in the cellular phone terminal 100 in the present embodiment.

On receiving the request for activation, the touch sensor driver upper application program interface API demands confirmation of whether activation of the touch sensor is possible or not from a block (not illustrated) which manages activation of the application in the base application BA. More specifically, the touch sensor driver upper application program interface API confirms lighting of the sub display unit ELD indicating that selection of the application is executed, or presence/absence of the flag which indicates activation of the application in which activation of the touch sensor being impossible is set in advance, of an FM radio or the other applications accompanying the cellular phone terminal 100. When activation of the touch sensor is determined as possible as a result, the touch sensor driver upper application program interface API requests the touch sensor driver TSD to activate the touch sensor module TSM. More specifically, the touch sensor driver upper application program interface API practically starts power supply to the touch sensor module TSM from the power supply PS via the power supply controller PSCON.

When activation is requested, the touch sensor driver TSD gives a request to the serial interface unit SI in the device layer DL to control opening the port with the touch sensor driver TSD in the serial interface unit SI.

Thereafter, the touch sensor driver TSD conducts control so that the signal having the information of the sensing result of the touch sensor (hereinafter, described as a contact signal) is output to the serial interface unit SI at the periods of 20 ms by the internal clock which the touch sensor module TSM has.

The contact signal is output as an 8-bit signal corresponding to eight sensor elements that are the aforementioned respective sensor elements L1 to L4 and R1 to R4. More specifically, this is the signal in which "flag: 1" indicating contact detection is set in the bit corresponding to the sensor element which detects the contact when each of the sensor elements detects the contact, and the contact signal is formed by the string of these bits. More specifically, the contact signal includes the information indicating "which sensor element" is "either contact or non-contact".

The serial interrupt monitoring unit SIMON in the interrupt handler IH extracts the contact signal output to the serial interface unit SI. Here, the confirming unit CNF confirms True/False of the contact signal which is extracted in accordance with the condition which is set in advance in the serial interface unit SI, and inputs only the data of a True (true) signal into the que QUE (Discrimination of True/False of the signals will be described later). Further, the serial interrupt monitoring unit SIMON monitors the other interrupt events of the serial interface unit SI during activation of the touch sensor, such as occurrence of pressing down of the tact switch.

When the detected contact is the first contact, the monitoring unit SIMON inputs the signal meaning "press" into the que QUE (queuing) before the contact signal. Thereafter, the monitoring unit SIMON updates the contact signal at periods of 40 ms of the clock by an OS timer CLK which the operation system has, and inputs the signal meaning "release" into the que QUE when it does not detect a predetermined number of contacts. Thereby, movement of the contact detection among the sensor elements from the start of the contact to release can be monitored. "The first contact" indicates the state without data in the que QUE, or the event in which a signal having "flag: 1" occurs when the immediate input data is "release". By these processings, the touch sensor driver TSD can know the detection state of the sensor elements in the section from "press" to "release".

At the same time, when the contact signal which is output from the touch sensor is the signal which satisfies the condition to be False, the monitoring unit SIMON preliminarily generates a signal meaning "release", and inputs it into the que QUE. Here, as the conditions to be False (false), "when contact is detected in two sensor elements which are discontinuous", "when interrupt occurs during activation of the touch sensor (for example, when lighting/extinguishing state of the sub display unit ELD is changed by notification of the arrival of a mail or the like)", "when push-down of the key occurs during activation of the touch sensor", or as described later in detail, "contact across a plurality of sensor element groups is detected" or the like is set.

Further, when the monitor unit SIMON detects contacts at the same time in the two adjacent sensor elements such as sensor elements R2 and R3, it inputs the contact signal in which flags are set in the bits corresponding to the elements which detect contact into the que QUE as in the case of detecting a single element.

The touch sensor driver TSD reads the contact signal from the que QUE at the periods of 45 ms, and determines the elements which detect contact by the read contact signals. The touch sensor driver TSD considers change of the contact determined by the contact signals which are read in sequence from the que QUE, and the positional relationship with the detected elements, and determines "the element of start of contact", "detection of the moving direction (clockwise/counterclockwise direction) of contact" and "moving distance from press to release". The touch sensor driver TSD writes the determined result into the result notifying unit NTF, and notifies the base application BA that the result should be updated.

The moving direction and moving distance of contact are determined by combination of detection of the adjacent sensor element and detection of each of the sensor elements, and various methods (determination rules) can be applied to this. For example, when contact transfers from a certain sensor element (for example, R2) to the adjacent sensor element (R3 in the case of this example), this is determined as the movement by one element amount (amount of one item of the selection candidate items in the sub display unit) in this direction.

As described above, when update of the result is notified to the base application BA by the touch sensor driver TSD, the base application BA confirms the result notifying unit NTF, and notifies the application which is a higher application and requires the touch sensor result (the display unit display application AP1 for menu screen display in the sub display unit, the lock security application AP2 for lock control, and the like) of the content of the information notified to the result notifying unit NTF.

Figure 5:
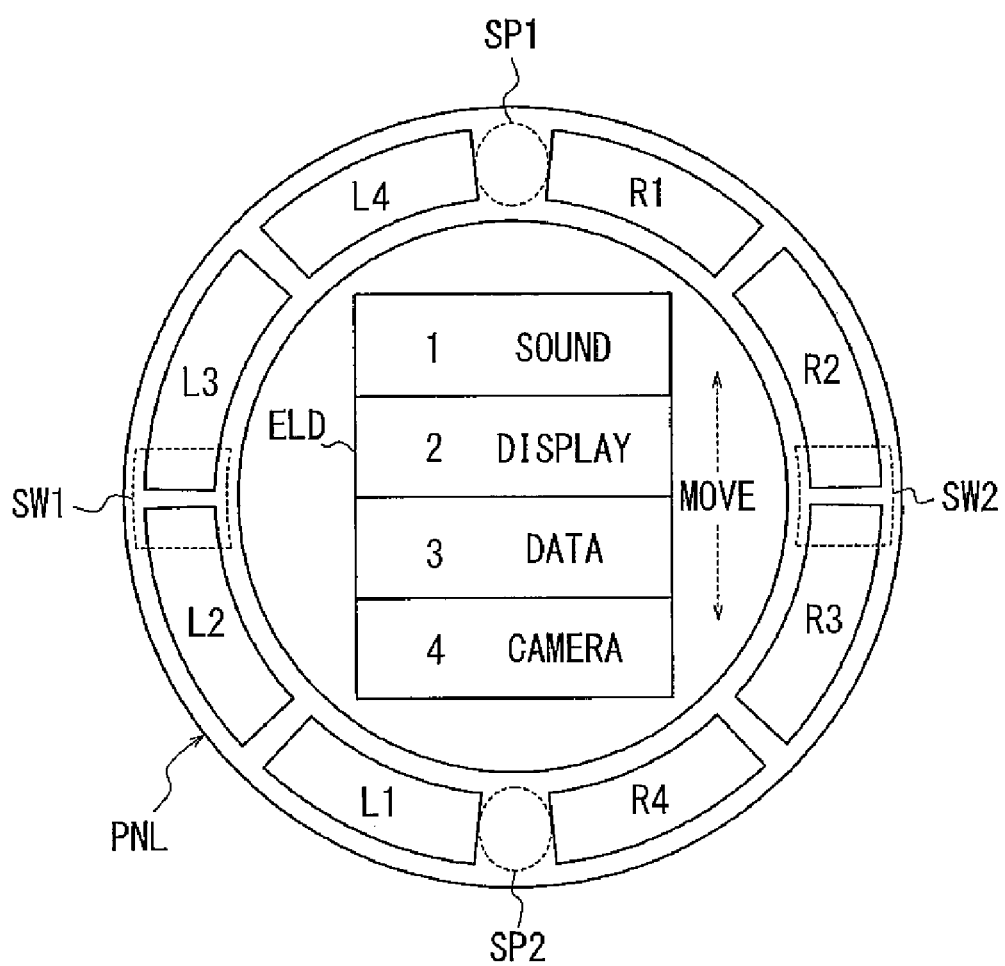
FIG. 5 is a plane view showing the placement of the components of the cellular phone terminal according to the present invention.
Figure 6:
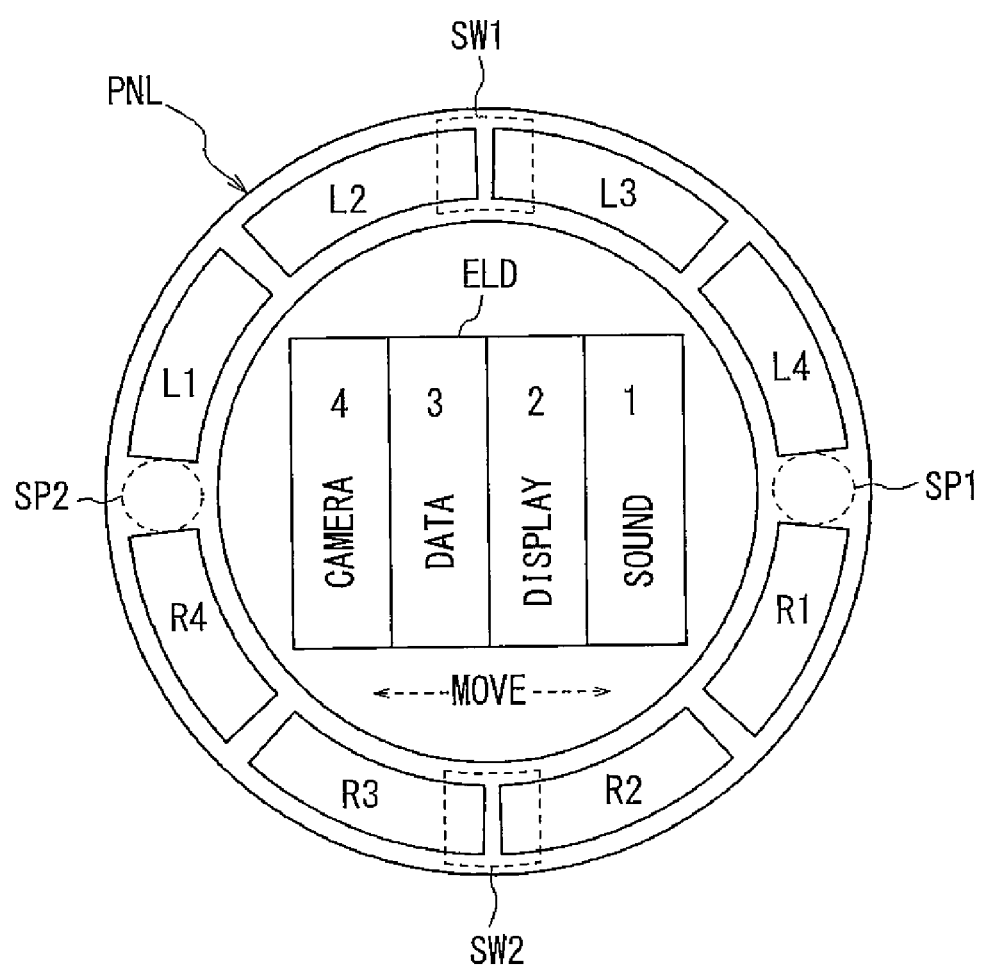
FIG. 6 is a plane view showing the placement of the components of the cellular phone terminal according to the present invention.

FIGS. 5 and 6 are plane views showing the placement of the components especially of the touch sensor unit 210 of the cellular phone terminal 100 according to the present invention. For convenience of creating the drawings and explanation, only unit of the components are illustrated and explained. FIG. 5 shows the case in which the sensor elements are placed in a circular form along the periphery of the sub display unit ELD to be laterally side by side with respect to the orientation of the display displayed on the sub display unit ELD, and FIG. 6 shows the case in which the sensor elements are disposed in a circular form along the periphery of the sub display unit to be vertically side by side with respect to the orientation of the display displayed on the sub display unit ELD. As shown in FIGS. 5 and 6, a circular panel PNL is placed along the periphery of the display unit ELD constituted of the organic EL element. The panel PNL is preferably made sufficiently thin so as not to have an influence on the sensitivity of the sensor elements provided in the lower portion. In the lower portion of the panel PNL, eight electrostatic capacitance type sensor elements L1 to L4 and R1 to R4 which can detect contact/approach of the fingers of a human body are continuously disposed in a substantially circular form. The four sensor elements L1 to L4 configure the first sensor element group G1, and the four sensor elements R1 to R4 configure the second sensor element group G2, respectively. Between the adjacent sensor elements in each of the sensor element groups, a clearance (gap) is provided so that the adjacent sensor elements do not interfere with the contact detection function of each other. When the sensor elements of a type which do not interfere with each other are used, the clearance is not necessary. A separation unit SP1 which is a clearance larger than the aforesaid clearance (for example, the length twice as long as or more) is provided between the sensor element L4 located at one end of the first sensor element group G1 and the sensor element R1 located at one end of the second sensor element group G2. A separation unit SP2 is provided similarly to the separation unit SP1 between the sensor element L1 located at the other end of the first sensor element group G1 and the sensor element R4 located at the other end of the second sensor element group G2. When the first sensor element group G1 and the second sensor element group G2 separately function, interference of a finger is restrained from each other by such separation units SP1 and SP2. Further, the boundaries of the two sensor element groups are made clear by the separation units SP1 and SP2, and operability is enhanced.

The respective sensor elements of the first sensor element group G1 are placed in a circular arc form, and the center of the tact switch SW1 is placed in the center of the circular arc, that is, the lower portion between the sensor elements L2 and L3, so that the operation of fixing the choice can be performed in the region of the first sensor element group G1. Similarly, the center of the tact switch SW2 is placed in the center of the circular arc formed by the respective sensor elements of the second sensor element group G2, that is, the lower portion between the sensor elements R2 and R3, so that the operation of fixing the choice can be performed in the region of the second sensor element group G2 (see FIG. 7). Like this, by placing the tact switch in substantially the center in the placement direction of the sensor element group, which is the position that is not suggestive of directionality, the user can easily grasp that the tact switch is the switch for performing operation which is not directly related to the direction indication by the operation with movement having the directionality of the finger by a user on the sensor element. Specifically, if the tact switch is placed at the end portion (for example, L1 or L4) instead of the center in the placement direction of the sensor element group, the tact switch is suggestive of the directionality toward the end portion side, and it easily gives the user misunderstanding that the tact switch is the "switch" to be pressed long to continue the moving operation by the touch sensor. Meanwhile, if the tact switch is placed in the center in the placement direction of the sensor element group as in the configuration of the present invention, the fear of occurrence of such misunderstanding is reduced, and a more comfortable user interface is provided. Further, the tact switch is placed below the sensor element, and is not exposed to the outer surface of the apparatus. Therefore, the number of the operation units which are exposed can be reduced in appearance of the apparatus, and gives a smart impression which does not require a complicated operation. When the tact switch is provided in the place other than the lower portion of the panel PNL, a through-hole needs to be additionally provided in the apparatus casing, and depending on the position where the through-hole is provided, reduction in the casing strength may occur. In the present configuration, by placing the tact switches below the panel PNL and the sensor elements, new through-holes do not need to be provided, and reduction in casing strength is suppressed.

In FIG. 5, when a user traces the sensor elements L1, L2, L3 and L4 sequentially with a finger in a circular arc form in the upward direction, the item which is displayed as the selection target region (reversing display, highlighting display in another color or the like though not illustrated here) out of the selection candidate items (sound, display, data, and camera in this case) displayed on the sub display unit ELD, sequentially changes to the item in the upper direction, or the selection candidate item is scrolled in the upper direction. In FIG. 6, for example, when a user traces the sensor elements L1, L2, L3 and L4 sequentially with a finger in a circular arc form in the rightward direction, the item which is displayed as the selection target region (reversing display, highlighting display in another color, or the like, though not illustrated here) out of the selection candidate items (sound, display, data, and camera in this case) displayed on the sub display unit ELD, sequentially changes to the item in the rightward direction, or the selection candidate item is scrolled in the rightward direction. Since one of the selection candidate items can be visually recognized in the selection target region (reversing display, highlighting display in another color or the like), operability is enhanced.

Further, when a desired selection candidate item is displayed as the selection target region, a user can perform a selection fixing operation of fixing the choice by pressing down the tact switch SW1 through the panel PNL and the sensor elements L2 and L3, and can change the display itself to another screen by pressing down the tact switch SW2. Specifically, the panel PNL has sufficient flexibility for pressing down the tact switches SW1 and SW2, or is mounted to the apparatus casing to be slightly tiltable, and has the role of a plunger for the tact switches SW1 and SW2.

Figure 7:
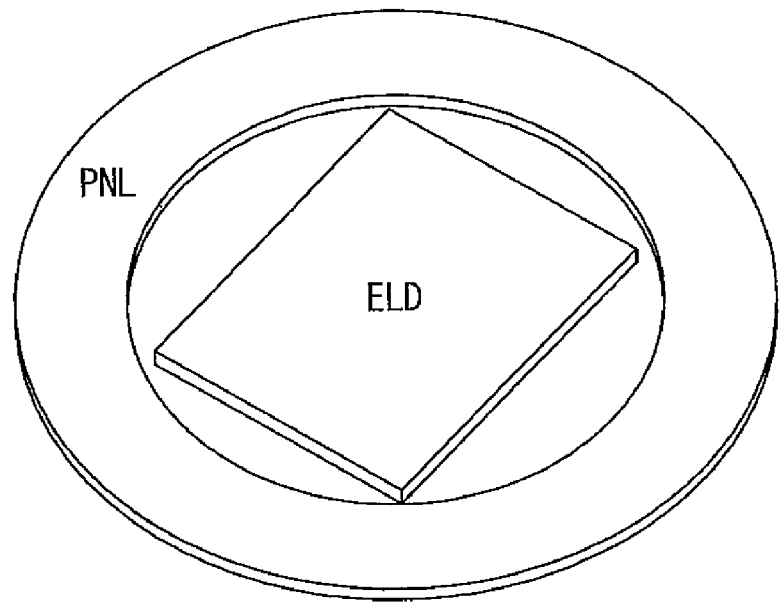
FIG. 7 is an exploded perspective view of the components of the cellular phone terminal shown in FIGS. 5 and 6.
Figure 7:
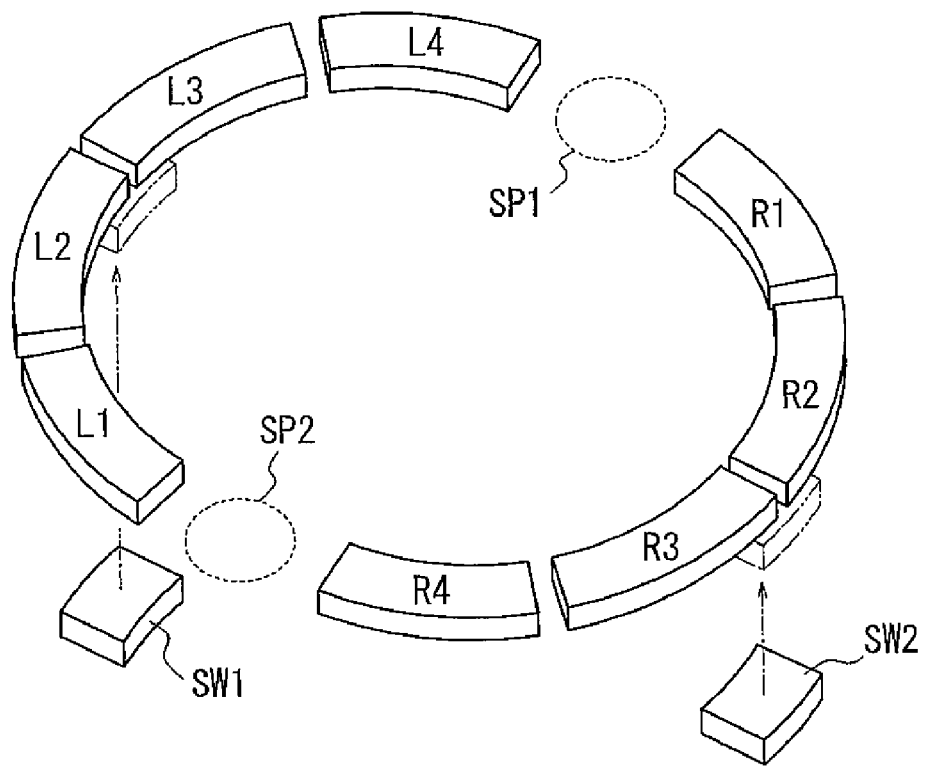

FIG. 7 is an exploded perspective view of the component, especially the touch sensor unit 210, of the cellular phone terminal shown in FIGS. 2, 5 and 6. As shown in the drawing, the panel PNL and the display unit ELD are placed on the first layer forming the outer surface of the terminal casing. The sensor elements L1 to L4 and R1 to R4 are placed on the second layer located below the panel PNL on the first layer. The tact switches SW1 and SW2 are placed respectively on a third layer located under a space between the sensor elements L2 and L3 of the second layer and under a space between the sensor elements R2 and R3.

Figure 8:
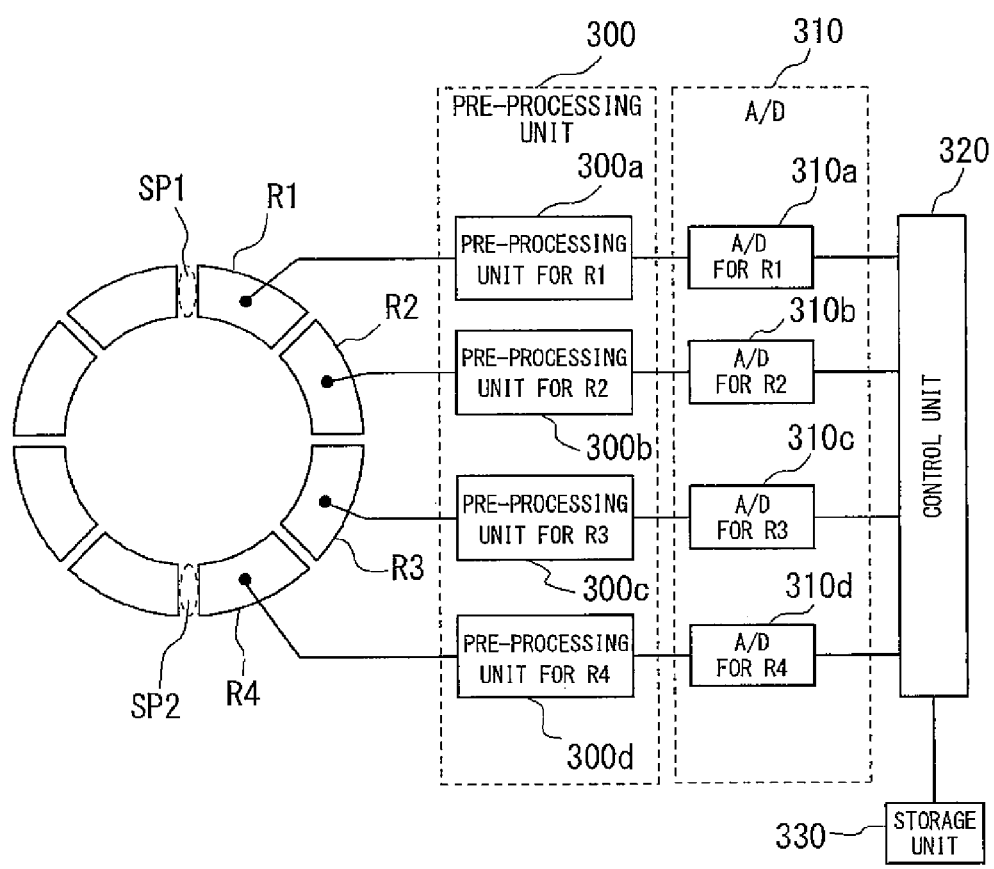
FIG. 8 is a schematic block diagram explaining processing of contact detection data from each sensor element in the cellular phone terminal according to the present invention.

FIG. 8 is a schematic block diagram explaining the processing of the contact detection data from each of the sensor elements in the cellular phone terminal according to the present invention. For simplification of the explanation, only the sensor elements R1 to R4 are shown, but the same thing applies to the sensor elements L1 to L4. High frequency wave is applied to each of the sensor elements R1 to R4, the high frequency state which is calibrated and recognized in consideration of a change in a constant stray capacitance is set as the reference, and when variation in the high frequency state based on the change in the electrostatic capacitance by contact of a finger or the like is detected in a pre-processing unit 300 (a pre-processing unit 300a for R1, a pre-processing unit 300b for R2, a pre-processing unit 300c for R3, a pre-processing unit 300d for R4), detection is transmitted to an A/D converter 310 (an A/D converter 310a for R1, an AD converter 310b for R2, an A/D converter 310c for R3, an A/D converter 310d for R4), and is converted into a digital signal indicating contact detection. The digitized signal is transmitted to a control unit 320, and as a set of collected signals as the sensor element group, the signal is stored in a storage unit 330 as the information which the signals hold. Thereafter, the signal is sent out to the serial interface unit, and the interrupt handler, and after the signal is converted into a signal which can be read by the touch sensor driver in the interrupt handler, and thereafter, the signal after conversion is input into the que. The control unit 320 detects the direction at the point of time when it detects contact in the two or more adjacent sensor elements based on the information stored in the storage unit 330.

Hereinafter, in FIGS. 9 to 12, response of the display unit to the operation of the sensor element will be described. In FIGS. 9 to 12, (a) is a schematic view showing only the sub display unit ELD mounted on the cellular phone terminal, and sensor elements disposed side by side along the periphery of it for simplification of the explanation, (b) is a diagram showing the sensor elements which are detected with a lapse of time, and (c) is a diagram showing the positional change of the operation target region of the sub display unit ELD corresponding to the detected sensor elements. In (a) of these drawings, the same reference numerals and characters as in FIG. 2 (b) are assigned to the sensor elements, sensor element groups and the separation units. Further, in the display of the sub display unit ELD of (c), TI denotes a title of the item list displayed by the sub display unit, and LS1 to LS4 denote the selection candidate items (for example, some lines capable of being scrolled). Further, in the sub display unit of (c), for the item in the state of the operation target, the cursor is placed on the item, or the item itself is highlighted by reversing display or the like so that the item can be identified as the present operation target region. In these drawings, the items which are displayed as the operation target region are shown by being highlighted by applying hatching. For convenience of explanation, "moving target" is explained in only the operation target region, but when the item itself is moved (scrolled), the sub display unit is operated on the similar principle.

Figure 9:
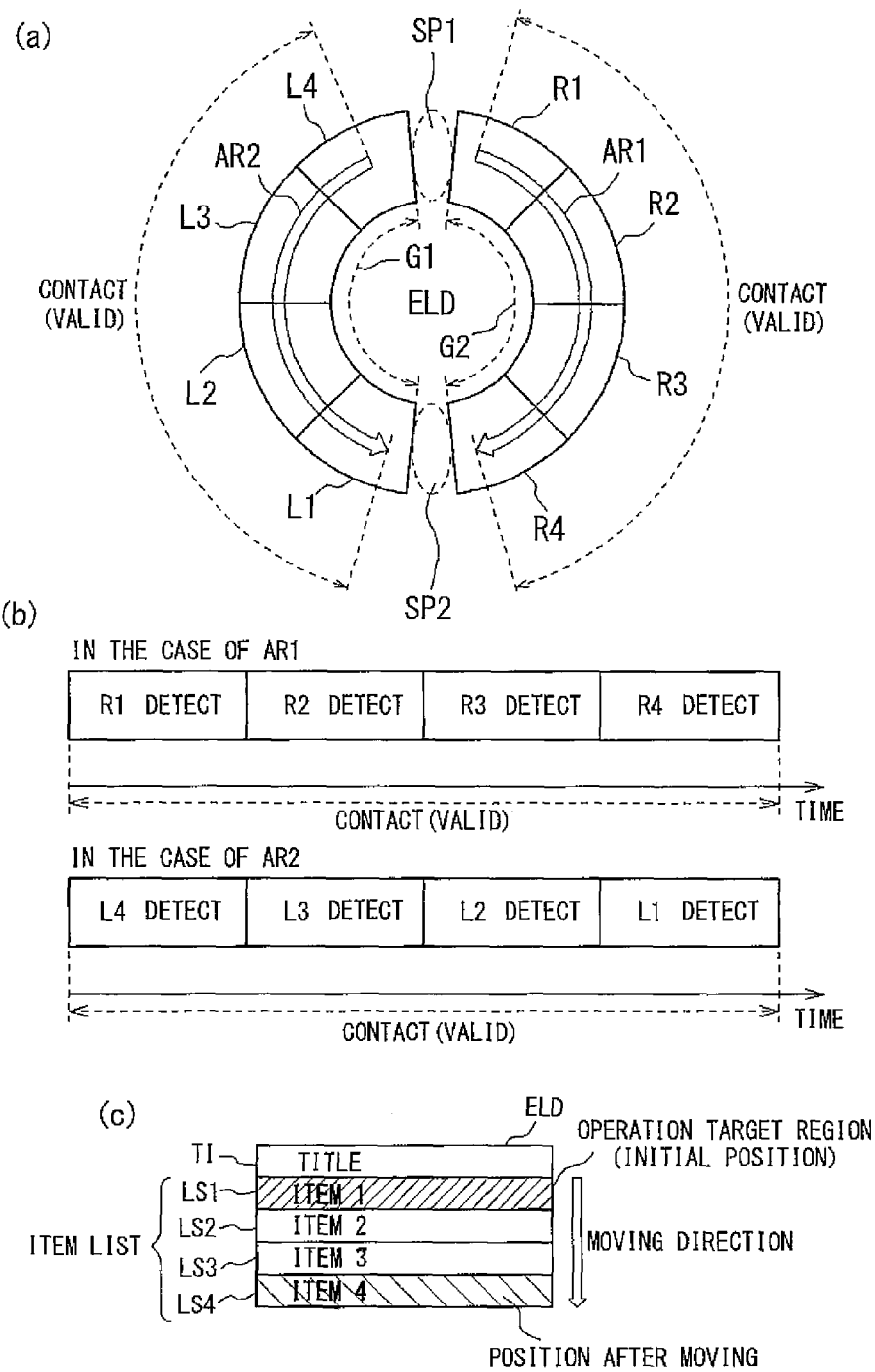
FIG. 9 is a diagram explaining the response of a sub display unit in the case of a user tracing over the sensor elements when sensor element groups are placed laterally side by side.
Figure 10:
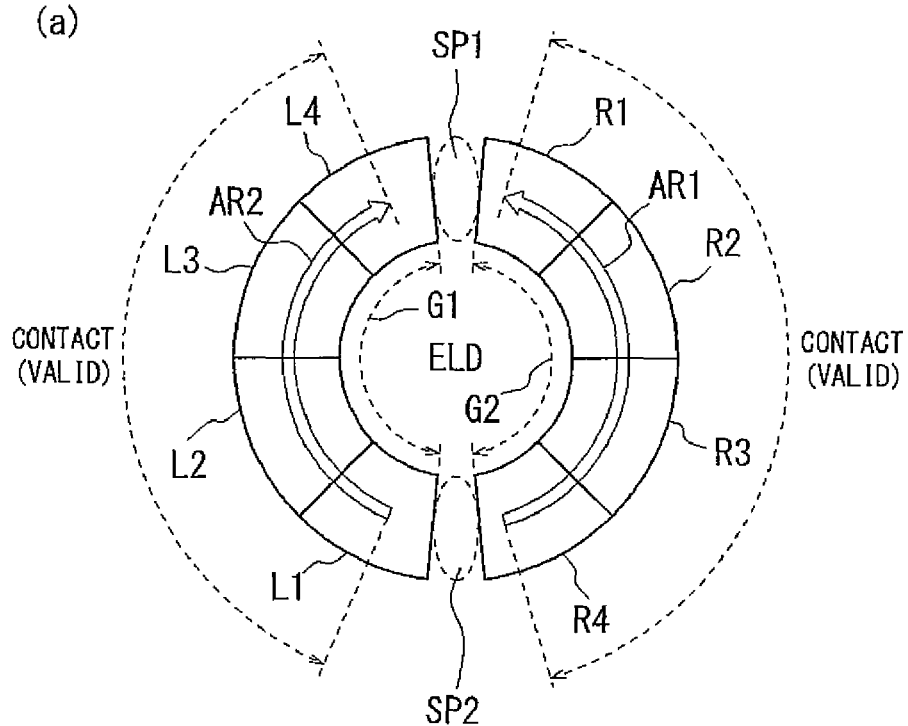
FIG. 10 is a diagram explaining the response of the sub display unit in the case of a user tracing over the sensor elements when the sensor element groups are placed laterally side by side.
Figure 10:
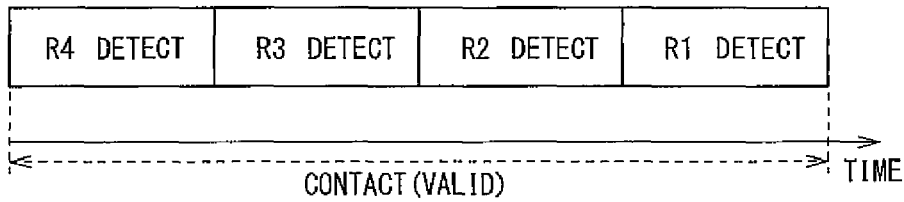
Figure 10:
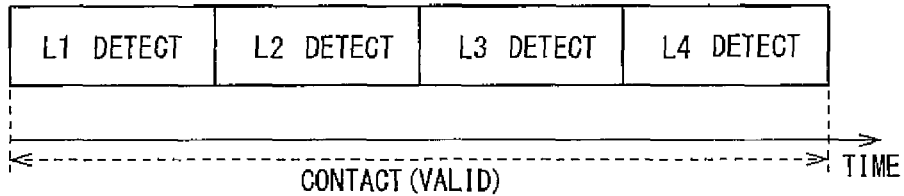
Figure 10:
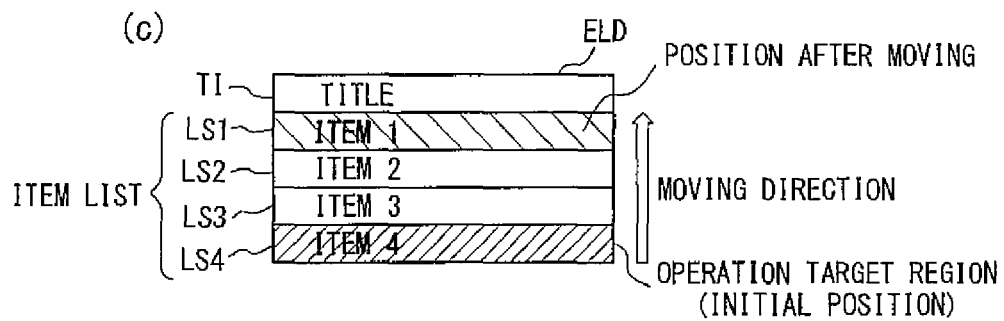

FIGS. 9 and 10 are diagrams explaining the response of the sub display unit in the case of the user tracing over the sensor elements when the sensor element groups are placed laterally side by side along the periphery of the sub display unit. When the respective elements are continuously traced by using contact means such as a finger, for example, in the downward direction from the top shown by the arrow AR1 (clockwise direction) in FIG. 9 (a), the control unit 110 detects the contact as the operation with movement with the lapse of time shown in (b). In this case, the operation is detected in sequence of the sensor elements R1, R2, R3 and R4. The continuous contact from R1 to R4 is detected by the two or more adjacent sensor elements, and therefore, detection of the direction is performed. In accordance with the number of times of transferring over the adjacent sensor elements and its direction, the operation target region moves on the list displayed on the sub display unit ELD. In this case, as shown in (c), the operation target region moves by three items downward from the item LS1 at the initial position to the item LS4. The operation target region is expressed by hatching, and the one with small hatching pitches is the initial position, whereas the one with large hatching pitches is the position after moving. Like this, according to the present configuration, "the operation target region" of the sub display unit "moves downward" as "the indication operation of a finger to the downward direction" of the user, and therefore, the user feels as if the user moved the operation target region with his or her own finger at will. Specifically, the operation feeling as the user intends can be obtained.

Similarly, when the elements are traced in the downward direction from the top shown by the arrow AR2 (counterclockwise direction) in FIG. 9 (a), the sensor elements L4, L3, L2 and L1 out of the respective elements detect the contact as the operation with movement in this sequence as shown in (b). The contact in this case is the contact transferring by three adjacent sensor elements to the downward direction from the top similarly to the arrow AR1, and therefore, as shown in (c), the operation target region Moves by three items downward from the item. LS1 to the item LS4.

When the sensor elements are traced to the upward direction from the bottom (counterclockwise direction) shown by the arrow AR1 in FIG. 10 (a), the sensor elements R4, R3, R2 and R1 out of the respective sensor elements detect the contact as the operation with movement in this sequence as shown in (b). The contact in this case is the contact which transfers by three adjacent sensor elements from the bottom to the top, and therefore, the operation target region moves by three items from the item LS4 to the item LS1 to the upward direction as in (c).

Likewise, when the sensor elements are traced upward from the bottom (clockwise direction) shown by the arrow AR2 in FIG. 10 (a), the sensor elements L1, L2, L3 and L4 out of the respective sensor elements detect the contact as the operation with movement in this sequence as shown in (b). The contact in this case is the contact which transfers by three adjacent sensor elements from the bottom to the top as the arrow AR1, and therefore, the operation target region moves by three items from the item LS4 to the item LS1 to the upward direction as in (c).

By dividing the sensor elements into the first sensor element group and the second sensor element group bilaterally symmetrically like this, bilateral symmetrical operability is provided, and operability which does not depend on a dominant hand is realized, which is convenient. Since such a bilateral symmetrical configuration and operability are provided, the first sensor element group G1 placed at the left side of the sub display unit ELD can be operated with a left hand, and the second sensor element group G2 which is placed at the right side of the sub display unit ELD can be operated with a right hand. In this case, the configuration is not such that the hand which performs the operation operates the first sensor element group or the second sensor element group across the sub display unit ELD, and therefore, the disadvantage that the hand which operates lies on the sub display unit ELD to make the operation difficult can be restrained.

Further, the operating direction of the moving operation and the display direction of a plurality of choices continuously selected by the direction correspond to each other, and therefore, operability is enhanced.

Figure 11:
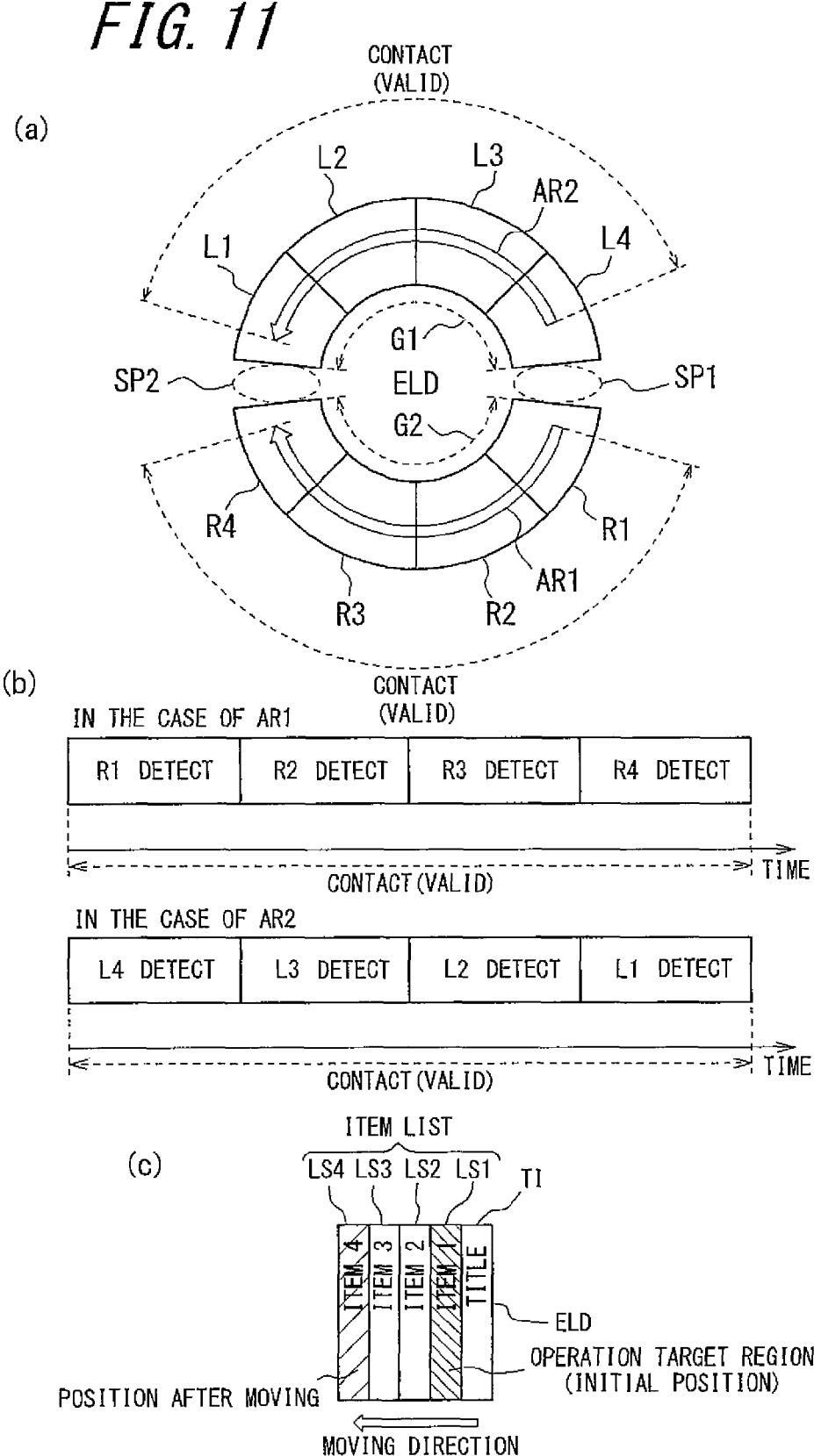
FIG. 11 is a diagram explaining the response of the sub display unit in the case of a user tracing over the sensor elements when the sensor element groups are placed vertically side by side.
Figure 12:
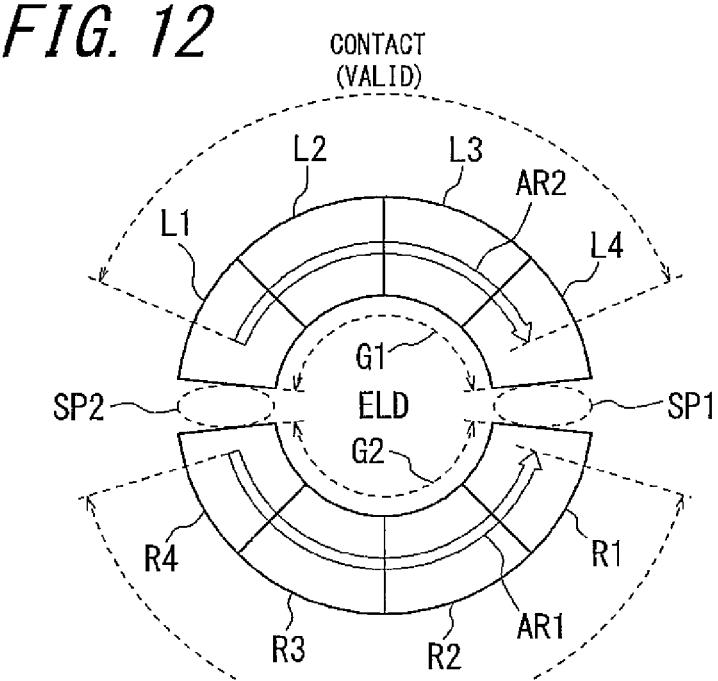
FIG. 12 is a diagram explaining the response of the sub display unit in the case of a user tracing over the sensor elements when the sensor element groups are placed vertically side by side.
Figure 12:
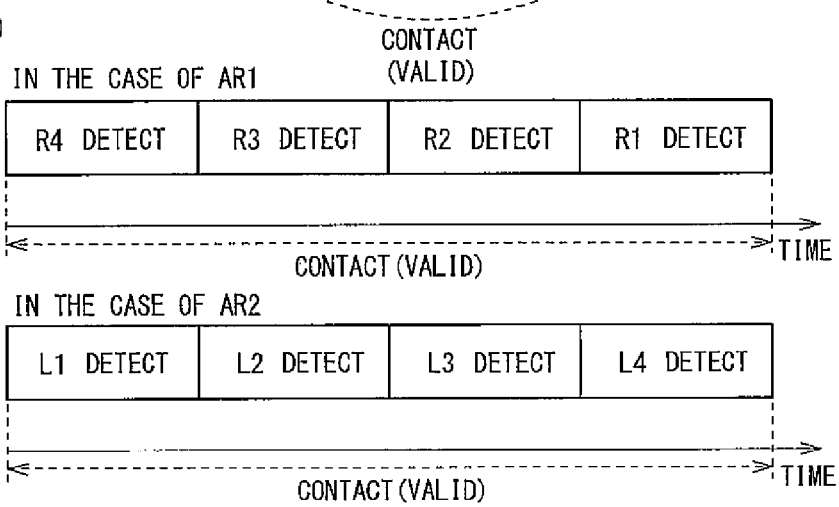
Figure 12:
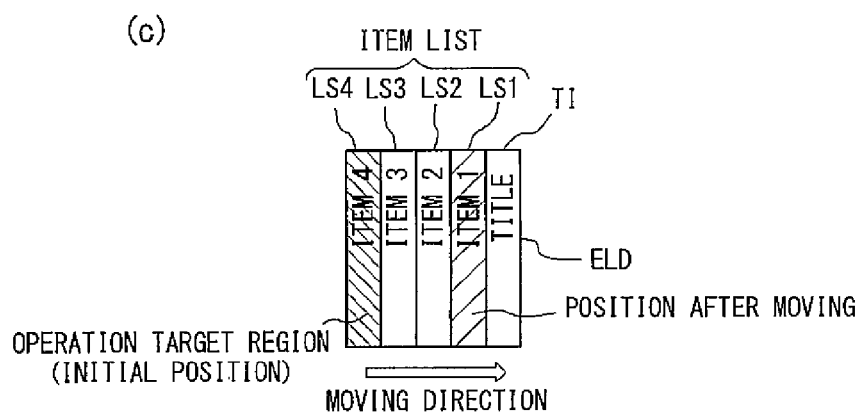
Figure 13:
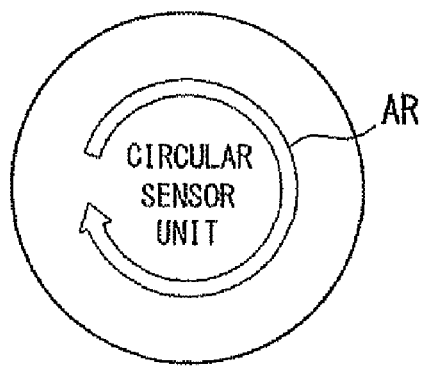
FIG. 13 is a diagram explaining a conventional sensor element and its control example.
Figure 13:
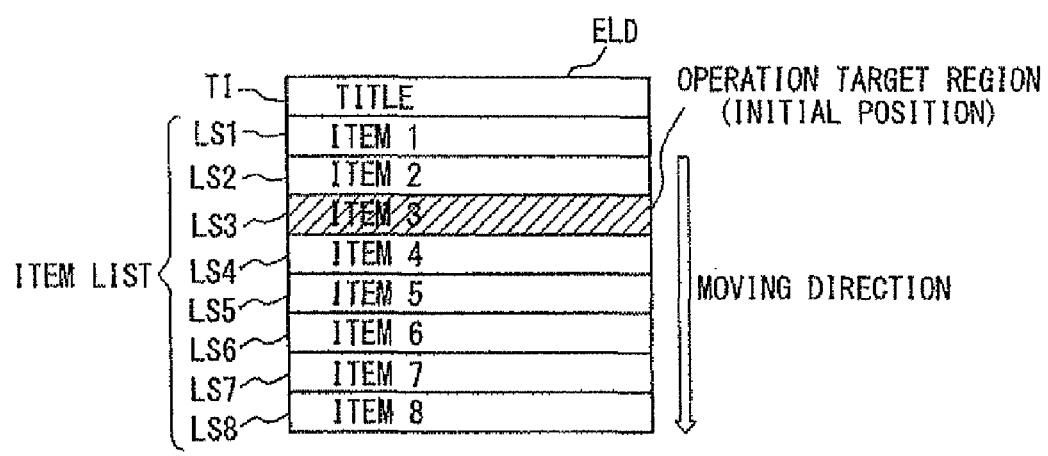

FIGS. 11 and 12 are diagrams explaining the response of the sub display unit in the case of the user tracing over the sensor elements when the sensor element groups are disposed vertically side by side along the periphery of the sub display unit. When the sensor elements are traced in the leftward direction from the right (clockwise direction) shown by the arrow AR1 in FIG. 11 (a), the sensor elements R1, R2, R3 and R4 out of the respective sensor elements detect the contact in this sequence as shown in (b). The contact in this case is the contact which transfers by the three adjacent sensor elements from the right to the left, and therefore, the operation target region moves by the amount of three items from the item LS1 to the Item LS4 in the leftward direction as (c).

Similarly, when the sensor elements are traced in the leftward direction (counterclockwise direction) from the right as shown by the arrow AR2 in FIG. 11 (a), the sensor elements L4, L3, L2 and L1 out of the respective sensor elements detect the contact in this sequence as shown in (b). The operation in this case is the contact which transfers by the three adjacent sensor elements from the right to the left as the arrow AR1, and therefore, the operation target region moves by the amount of three items from the item LS1 to the item LS4 in the left direction as in (c).

When the sensor elements are traced in the rightward direction from the left (counterclockwise direction) shown by the arrow AR1 in FIG. 12 (a), the sensor elements R4, R3, R2 and R1 out of the respective sensor elements detect the contact in this sequence as shown in (b). The operation in this case is the contact which transfers by the three adjacent sensor elements from the left to the right, and therefore, the operation target region moves by the amount of three items from the item LS4 to the item LS1 in the rightward direction as (c).

Similarly, when the sensor elements are traced in the rightward direction (clockwise direction) from the left as shown by the arrow AR2 in FIG. 12 (a), the sensor elements L1, L2, L3 and L4 out of the respective sensor elements detect the contact in this sequence as shown in (b). The operation in this case is the contact which transfers by the three adjacent sensor elements from the left to the right as the arrow AR1, and therefore, the operation target region moves by the amount of three items from the item LS4 to the item LS1 in the rightward direction as in (c).

By dividing the sensor elements into the first sensor element group and the second sensor element group vertically symmetrically like this, vertical symmetrical operability is provided, and operability which does not depend on a dominant hand is realized, which is convenient. Further, the operating direction of the moving operation and the display direction of a plurality of choices continuously selected by the direction correspond to each other, and therefore, operability is enhanced.

As described above, in the present invention, the sensor elements are configured by being divided into a plurality of sensor element groups, and even when the directions of the operations with movement which are made in a plurality of sensor element groups are respectively the same, the selection operation control corresponding to the plurality of sensor element groups can be made different, and therefore, operability can be enhanced. More specifically, the moving operation for the region of the first sensor element group G1, and the moving operation for the region of the second sensor element group G2 differ from each other, since the former is the operation for moving the operation target region in the upward direction for the clockwise operation, and for moving the operation target region in the downward direction for the counterclockwise operation, whereas the latter is the operation for moving the operation target region in the downward direction for the clockwise operation, and for moving the operation target region in the upward direction for the counterclockwise direction. Namely, the range of operability can be increased.

In the present embodiment, the moving operation in a predetermined direction indicates the moving operation in either the clockwise direction or the counterclockwise direction, and for the identity of the direction of the moving operation, the identities of such two directions are configured to be determined, but the present invention is not limited to this. Namely, the direction of the moving operation is not limited to the circular motion direction such as a clockwise direction or a counterclockwise direction, and may be a linear motion direction. The identity of the direction in this case is determined by the identity in the linear motion direction.

For example, as described above, when the sensor element group which is disposed in a bar shape is divided into a plurality of regions, the selection operation control relating to the moving operation in one direction for one region, and the selection operation control relating to the moving operation in one direction for the other region may be made different from each other, and the selection operation control relating to the moving operation in a number of directions for the other region, and the selection operation control relating to the moving operation in the other direction for the other region may be made different from each other. Here, the relationship of one direction and the other direction is synonymous with the relationship in which the vector components are reverse from each other.

The present invention is described based on the drawings and embodiment, but attention should be paid to that a person skilled in the art easily makes various modifications and corrections based on the present disclosure. Accordingly, it should be noted that these modifications and corrections are included in the range of the present invention. For example, in the present embodiment, when the sensor elements are configured by being divided into a plurality of sensor element groups, and the directions of the operations with movement which are performed in the regions of a plurality of sensor element groups are the same, the selection operations corresponding to the regions of a plurality of sensor element groups are made different from each other, but the present invention is not limited to this, and the selection operations corresponding to the regions of a plurality of sensor element groups also may be made different from each other in accordance with the moving speed of the operations relating to the same direction which are made in the regions of a plurality of sensor element groups.

For example, when the moving speeds of the operations relating to the same direction which are performed in the regions of a plurality of sensor element groups are a predetermined speed or lower, the selection operations corresponding to a plurality of sensor element groups are made different from each other, and when the moving speeds of the operations relating to the same direction which are performed in the regions of a plurality of sensor element groups are higher than the predetermined speed, the selection operations corresponding to a plurality of sensor element groups may be configured not to differ from each other.

More specifically, for example, in FIG. 5, when the directions of the operations which are performed in the first sensor element group G1 and the second sensor element group G2 are the clockwise direction, and the moving speeds are a predetermined speed or lower, the selection target region is moved from the bottom to the top with respect to the display direction of the sub display unit ELD for the operation which is performed in the first sensor element group G1, and for the operation which is performed in the second sensor element group G2, the selection target region is moved from the top to the bottom with respect to the display direction of the sub display unit ELD, whereby the selection operations corresponding to the first sensor element group G1 and the second sensor element group G2 are made different from each other.

Meanwhile, when the directions of the operations which are performed in the first sensor element group G1 and the second sensor element group G2 are the same clockwise directions, and the moving speeds are the speeds higher than a predetermined speed, the selection target region is moved from the bottom to the top, or from the top to the bottom with respect to the display direction of the sub display unit ELD for the operation which is performed in the first sensor element group G1, whereby the selection operations corresponding to the first sensor element group G1 and the second sensor element group G2 are not made different from each other. Whether the selection target region is moved from the bottom to the top or from the top to the bottom at this time is determined based on whether the operation is sensed as the operation in the upward direction with respect to the display direction of the sub display unit ELD, or is sensed as the operation in the downward direction. Specifically, when the clockwise operation is started from the first sensor element group G1 and is sensed as the operation in the upward direction with respect to the display direction of the sub display unit ELD, the selection target region is moved from the bottom to the top with respect to the display direction of the sub display unit ELD, and when the operation is started from the second sensor element group G2 and is sensed as the operation in the downward direction with respect to the display direction of the sub display unit ELD, the selection target region is moved from the top to the bottom with respect to the display direction of the sub display unit ELD.

Thereby, the user also can control the selection operations corresponding to the sensor element groups G1 and G2 in accordance with the moving speed of the operation, and the range of operability is significantly increased. Especially in this case, the sensor element groups G1 and G2 are continuously arranged in a circular arc form bilaterally symmetrically with respect to the display direction of the sub display unit ELD. Therefore, the user can select whether to use the two sensor element groups G1 and G2 as the combination of the sensor element groups formed by two semicircles, or to use them as the sensor element group formed by one circle, and can favorably use the sensor element groups G1 and G2 divided into two.

The method for causing the control of the selection operations corresponding to the regions of a plurality of sensor element groups to differ in accordance with the moving speed is not limited to this, but may be other methods.

Further, the functions or the like included in each of the members, each means and each of the steps can, be rearranged so as not to be logically inconsistent, and a plurality of means, steps and the like can be combined into one, or divided. For example, the embodiment is described with the sensor element layout provided in a circular form, but the sensor element group placed in a bar shape or a U shape may be placed by being divided into a plurality of regions. Further, in the embodiment, the case in which the sensor elements are configured by being divided into the two sensor element groups, but the present invention can be applied to the case where the sensor elements are configured by being divided into three or more of sensor element groups. Further, the embodiment is described by citing the cellular phone terminal, but the present invention can be widely applied to portable electronic apparatuses such as the portable radio terminals other than a telephone, PDA (personal digital assistance), a portable game machine, a portable audio player, a portable video player, a portable electronic dictionary, and a portable electronic book viewer.

CROSS REFERENCE TO RELATED APPLICATION

The present application is based upon and claims the benefit of priority from the prior Japanese Patent Application No. 2006-229537 (filed on Aug. 25, 2006); the entire contents of which are incorporated herein by reference.

The invention claimed is:

1. A portable electronic apparatus comprising
a display unit displaying a plurality of choices;
an operation detecting unit detecting a moving operation; and
a selection operation control unit controlling a selection operation by moving a position of an operation target region in the plurality of choices in a certain direction based on a direction of the moving operation detected by the operation detecting unit, wherein the selection operation selects one choice from the plurality of choices,
characterized in that
the operation detecting unit is configured with a plurality of detection regions placed in a circular form, and when either an operation with clockwise or counterclockwise movement is detected in the plurality of detection regions, the selection operation control unit controlling the moving direction of the position of the operation target region wherein:
(a) the moving direction of the position of the operation target region caused by the detection of the moving operation in a detection region and the moving direction of the position of the operation target region caused by the detection of the moving operation in another detection region is different when a speed of the moving operation is equal to or lower than a predetermined speed; and
(b) the moving direction of the position of the operation target region caused by the detection of the moving operation in a detection region and the moving direction of the position of the operation target region caused by the detection of the moving operation in another detection region is the same when the speed of the moving operation is higher than the predetermined speed.

2. The portable electronic apparatus according to claim 1, characterized in that the operation detecting unit is configured in a circular form and divided into two regions, and the display unit is provided in a central region of the operation detecting unit.

3. The portable electronic apparatus according to claim 2, characterized in that the display unit is configured to display the plurality of choices, and highlight one choice selected by the selection operation control unit out of the plurality of choices which are displayed.

4. The portable electronic apparatus according to claim 2, characterized in that the operation detecting unit placed in the circular form is divided into two regions that are a left region and a right region bilaterally symmetrically with respect to an orientation of display displayed on the display unit.

5. The portable electronic apparatus according to claim 2, characterized in that the operation detecting unit placed in the circular form is divided into two regions that are an upper region and a lower region vertically symmetrically with respect to an orientation of display displayed on the display unit.

6. The portable electronic apparatus according to claim 4, characterized in that the operation detecting unit detects an operation with clockwise movement in the left region, and an operation with counterclockwise movement in the right region as a first operation, and detects an operation with counterclockwise movement in the left region, and an operation with clockwise movement in the right region as a second operation.

7. The portable electronic apparatus according to claim 5, characterized in that the operation detecting unit detects an operation with clockwise movement in the upper region, and an operation with counterclockwise movement in the lower region as a third operation, and detects an operation with counterclockwise movement in the upper region, and an operation with clockwise movement in the lower region as a fourth operation.

8. The portable electronic apparatus according to claim 6, characterized in that the display unit displays choices which are continuously selected by the selection operation control unit as the plurality of choices by arranging the choices in sequence from a bottom to a top with respect to an orientation of the display based on continuous operation of the first operation, and displays choices which are continuously selected by the selection operation control unit as the plurality of choices by arranging the choices in sequence from the top to the bottom with respect to the orientation of the display based on continuous operation of the second operation.

9. The portable electronic apparatus according to claim 7, characterized in that the display unit displays choices which are continuously selected by the selection operation control unit as the plurality of choices by arranging the choices in sequence from a left to a right with respect to an orientation of the display based on continuous operation of the third operation, and displays choices which are continuously selected by the selection operation control unit as the plurality of choices by arranging the choices in sequence from the right to the left with respect to the orientation of the display based on continuous operation of the fourth operation.

10. The portable electronic apparatus according to claim 1, characterized in that fixing means for fixing one choice selected by the selection operation control unit out of the plurality of choices is provided.

* * * * *